(12) United States Patent
Van Blokland

(10) Patent No.: US 12,404,116 B2
(45) Date of Patent: Sep. 2, 2025

(54) METHOD AND DEVICE FOR COLLECTING LITTER OR SCRAPINGS

(71) Applicant: Radie B.V., Culemborg (NL)

(72) Inventor: Johannes Josephus Antonius Van Blokland, Culemborg (NL)

(73) Assignee: Radie B.V., Culemborg (NL)

( * ) Notice: Subject to any disclaimer, the term of this patent is extended or adjusted under 35 U.S.C. 154(b) by 177 days.

(21) Appl. No.: 18/129,974

(22) Filed: Apr. 3, 2023

(65) Prior Publication Data

US 2023/0312266 A1 Oct. 5, 2023

(30) Foreign Application Priority Data

Apr. 4, 2022 (NL) ...................................... 2031488

(51) Int. Cl.
*B65G 45/14* (2006.01)
*B65G 45/20* (2006.01)

(52) U.S. Cl.
CPC ...... *B65G 45/14* (2013.01); *B65G 2201/0202* (2013.01)

(58) Field of Classification Search
CPC .................................. B65G 45/14; B65G 45/20
USPC ......................................................... 198/498
See application file for complete search history.

(56) References Cited

U.S. PATENT DOCUMENTS

| | | | | |
|---|---|---|---|---|
| 1,330,967 A * | 2/1920 | Winters | ................ | B65G 45/14 139/1 C |
| 4,494,647 A * | 1/1985 | Davis | .................... | B65G 45/10 222/404 |
| 5,585,015 A * | 12/1996 | Hayashi | ............. | B23K 26/0838 219/121.72 |
| 5,657,852 A * | 8/1997 | Bavington | ............. | B65G 33/24 198/496 |
| 6,932,210 B2 * | 8/2005 | Kramer | ................ | B65G 45/005 198/493 |
| 7,083,039 B2 * | 8/2006 | Schloesser | ............. | B65G 45/18 198/496 |
| 8,727,101 B2 * | 5/2014 | Chiarini | ................ | B65G 45/10 198/497 |
| 10,507,986 B2 * | 12/2019 | Rogan | ..................... | B65G 45/26 |
| 10,722,919 B2 * | 7/2020 | Beach | ................... | C02F 11/127 |

FOREIGN PATENT DOCUMENTS

| | | |
|---|---|---|
| CN | 106477277 A | 3/2017 |
| CN | 110369333 A | 10/2019 |
| CN | 209651274 U | 11/2019 |
| CN | 212981523 U | 4/2021 |

(Continued)

OTHER PUBLICATIONS

Search Report dated Apr. 4, 2022, Application No. NL2031488.

*Primary Examiner* — Douglas A Hess
(74) *Attorney, Agent, or Firm* — The Dobrusin Law Firm, PC

(57) ABSTRACT

Device for collecting litter or scrapings, in particular flour or meal, comprising a collecting chute for receiving litter or scrapings, extending in a width direction, a movable catching body extending diagonally from a highest part to a lowest part over an area in which the litter or granule is to be collected and where the lowest part is adjacent to the collecting chute or connects to the collecting chute or discharges into the chute, and a drive unit for moving the receiving body.

12 Claims, 2 Drawing Sheets

(56) References Cited

FOREIGN PATENT DOCUMENTS

| | | | |
|---|---|---|---|
| CN | 113663920 | A | 11/2021 |
| CN | 213770274 | U | 11/2021 |
| DE | 2812628 | A1 | 9/1978 |
| DE | 2942336 | A1 | 4/1981 |
| DE | 202006014703 | U1 | 11/2006 |
| GB | 664953 | A | 1/1952 |

* cited by examiner

METHOD AND DEVICE FOR COLLECTING LITTER OR SCRAPINGS

The present invention relates to a device for collecting litter or scrapings, in particular flour or meal.

Flour or meal is used in dough processing as an anti-sticking agent, among other things, and applied to dough transport substrates for this purpose. In doing so, it cannot be avoided that a surplus of such litter remains on the substrate, which is formed, for example, by a conveyor belt.

That litter should then be removed from the belt, for example by dropping it through a gap between a transition between two successive belts, or by scraping it off the belt. In either case, it should be collected and it is possible to dispose of it, whether or not for (re)use in (the same) dough processing (line).

When collecting litter or scrapings, such as flour or flour, a common problem is that the litter or scrapings accumulate and even adhere or crust on the place and/or component on which they are collected. This is undesirable for hygiene and food safety reasons in the first place, but such accumulations can also lead to blockages, whereby the litter or scrapings can negatively affect the operation of the dough line or the quality of the products made on it.

Patent publication GB 664953 discloses improvements to belt conveyors in general, and in particular for coal transport. The device shown comprises eccentric strap rods that make the tray rise and fall. Such up and down movement wherein a tray is lifted cannot be applied in a bakery environment for flour, since it will scatter and atomise the flour or meal, causing more problems than it could solve.

The same goes for patent publication CN113663920A1 having a shaking tray that also moves up and down.

It is an object of the present invention to prevent such undesirable disruptions and, more particularly, to provide a useful alternative to existing methods and devices for collecting litter or scrapings.

For this purpose, the invention provides a device for collecting litter or scrapings, in particular flour, comprising a collecting chute for receiving litter or scrapings, a movable receiving body extending diagonally from a highest part to a lowest part over an area in which the litter or scrapings is to be collected and where the lowest part is adjacent to the collecting chute or connects to the collecting chute or discharges into the chute, and a drive unit for moving the receiving body. The collecting chute may be applied underneath a transition between conveyor belts, wherein it is extending in a width direction, that is: a width direction perpendicular to a length direction in which the conveyors belts extend and convey dough products. However, it is also thinkable that the receiving body covers the area in which flour or meal is expected to fall in between the conveyor belts, wherein the direction from the highest part to the lowest part may be any direction with respect to the direction of conveyance of the conveyor belts. The collecting chute may then extend along the lowest part of the receiving body. By using a movable receiving body, the accumulation or caking of litter or scrapings is prevented and it is achieved that—whether or not partly under the influence of gravity—it moves via the receiving body into the collecting chute. From there, it can be further drained and possibly fed back to the dough processing process.

Although it is conceivable that the receiving body is formed by a conveyor such as an endless belt, such a solution entails the risk that litter or scrapings will adhere to it as well, which will not solve the problem or will only shift it. Preferably, therefore, the receiving body comprises or is formed by an essentially plate-shaped part. Further preferably, it is substantially flat or formed concave such that at least that portion on which litter or scrapings lands is oriented under a sloping in the direction of the collecting chute. In general, the receiving body according to the invention is formed or arranged as non-rotatable and/or as a non-rotating element.

The receiving body is preferably movable in a plane parallel to a tangent plane to the receiving body at the level of the lowest part. For that part of the plane it then applies that it moves (only) in its own plane. If the entire intercepting body is (mainly or mostly) plate-shaped, the entire plate-shaped part only moves in its own plane. The movement then consists mainly of sliding. In contrast to movements with a directional (component) perpendicular to the plane of the plate-shaped part, this direction of movement leads much less to atomisation and otherwise further spreading of the litter or scrapings. For this reason, there is in particular no movement of the receiving body in a direction or with a directional component perpendicular to the mathematical plane in which the receiving body extends.

A directional component is a mathematical term. A direction in an angle may be seen as a composition of a horizontal and a vertical (and in a three dimensional case: and a depth) direction. Each of these are considered as a component. Instead of referring to absolute horizontal and vertical directions, reference may also be made to other vectors, or, such as is the case here, to a specific plane.

In a further embodiment, the drive is arranged for alternating movement of the receiving body. Such movement, which can be seen as sliding or vibrating, in combination with the inclined orientation gives the effect that litter or scrapings efficiently slide down to the collecting chute.

Preferably, the drive is arranged to move the receiving body with at least a directional component in the direction of the collecting chute. In other words, there is movement (to and from) the collecting chute and no vertical shaking.

In yet a further embodiment, the channel is equipped with a driveable discharge device for removing collected litter or scrapings from the collecting chute. Here, it is advantageous if the movable receiving body and the discharge device can be driven by the same drive unit.

For example, the discharge device may comprise a screw or spiral conveyor where the drive of the movable receiving body engages with (a circumferential part of) the screw or spiral conveyor for the purpose of driving it.

In a preferred embodiment, the discharge device has at least one carriage, such as a cantilever or ridge, extending into a space in which the screw or spiral conveyor moves during operation so that the at least one carriage is forced out of position once per revolution by at least one circumferential part of the screw or spiral conveyor, taking the catch body with it.

Such a carriage is preferably designed in such a way that it converts rotational movement of the screw or spiral conveyor into a displacement in the desired direction.

If the drive is arranged to move the receiving body with at least a directional component in the direction of the collecting chute, the carriage may be equipped with a bevel, which converts a pushing force applied to the carriage by the screw or spiral conveyor into a displacement with a directional component in the direction of the collecting chute.

In a further embodiment, the device according to the invention comprises multiple carriages, wherein at least one of the carriages is movable relative to the receiving body, with a directional component in the direction towards the screw or spiral conveyor, for setting an amplitude of movement of the receiving body, or in the direction in which the screw or spiral conveyor extends, for setting a moment of movement of the receiving body.

By equipping the receiving body with several carriages placed with a pitch different from the pitch of the screw or spiral conveyor, a movement frequency higher than the number of revolutions of the screw or spiral conveyor can be achieved. It also allows the moments of movement to be set.

An amplitude of movement can be set by the degree to which the carriage extends within the space in which the screw or spiral conveyor moves.

The invention further relates to a device for processing dough or dough pieces, comprising a conveyor for the dough or dough pieces, in particular a conveyor belt, comprising a dispensing point for discharging litter or scrapings from the conveyor, wherein the collection device is arranged below the dispensing point for collecting the litter or scrapings. In this regard, the width direction of the device for collecting litter or shavings preferably corresponds to the width direction of the conveyor for dough pieces.

Such a device may include a scraping device installed at the delivery point for loosening the litter or scrapings from the conveyor for removal purposes.

The invention also relates to a method for collecting litter or scrapings, comprising collecting the litter or scrapings on a receiving body extending obliquely towards a collecting chute, and moving, in particular alternating movement of the receiving body.

The invention will now be explained using the following figures. Herein:

Figure 1:
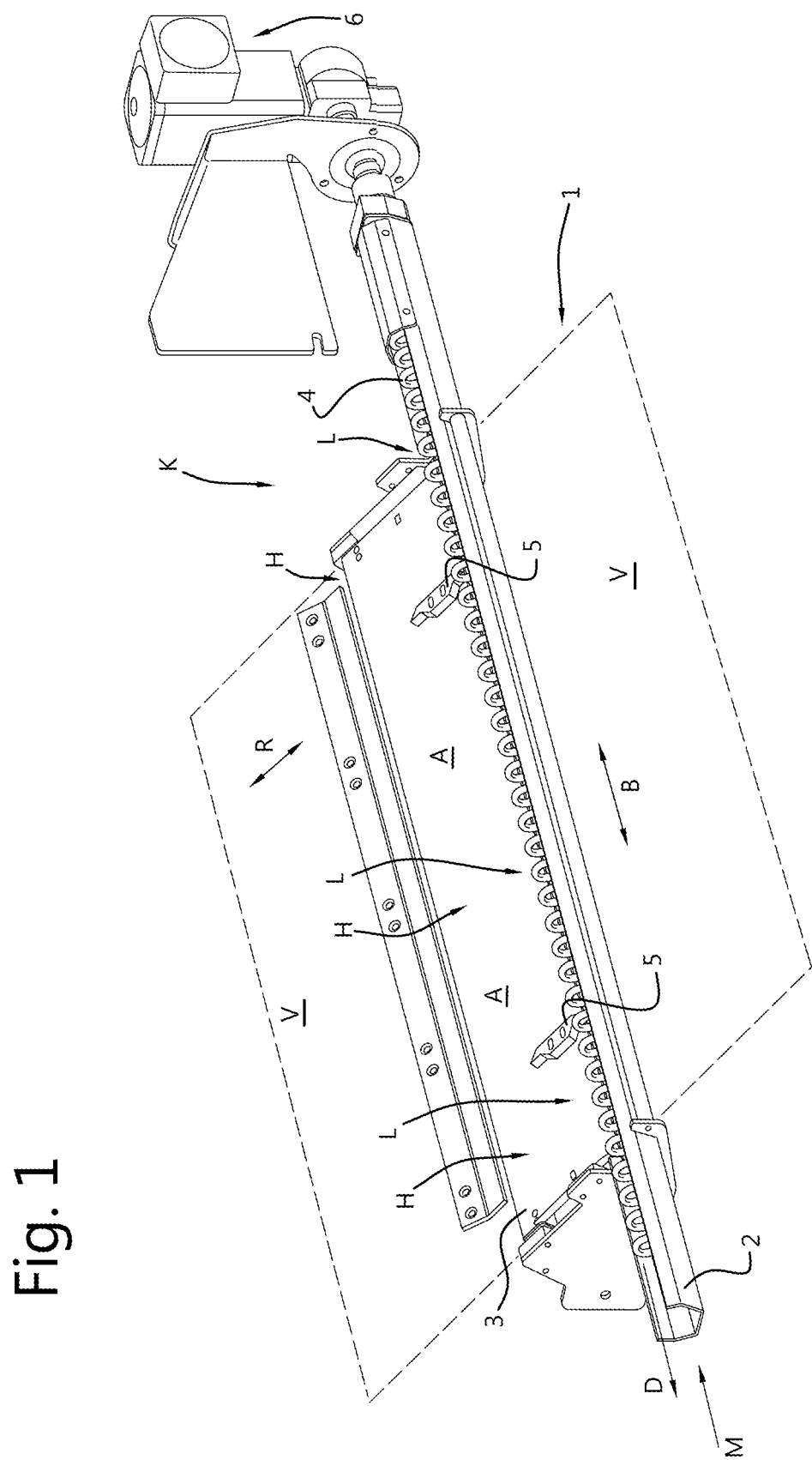
FIG. 1 shows a perspective view of part of a device according to the invention.

FIG. 1 shows a perspective view of a part of a device 1 according to the invention, for collecting litter or scrapings (not shown), in particular flour or meal, comprising a collecting chute 2 for receiving litter or scrapings, extending in a direction B and a movable collecting body 3 comprising a plate and in particular substantially flat and inclined from a highest part H to a lowest part L extending over an area A in which the litter or scrapings is to be collected and where the lowest part L connects to the collecting chute 2. The receiving body 3 is movable in a plane V parallel to a tangent plane to the receiving body 3 at the level of the lowest portion L. In the case shown, where the receiving body 3 is itself planar, the receiving body 3 thus moves in its own plane. The device 1 is provided with a drive device arranged to move the receiving body 3 with at least one directional component in the direction R of the collecting chute 2. The collecting chute is provided with a driveable discharge device formed by a screw or spiral conveyor 4 for discharging collected litter or scrapings from the collecting chute 2.

The receiving body 3 is provided with two carriages 5 formed by cams 5 extending into a space in which the screw or spiral conveyor 4 moves during operation so that the carriages 5 are forced out of their position once per revolution by at least one circumferential part of the screw or spiral conveyor 4, taking the receiving body 3 with them. The screw or spiral conveyor 4 is driven by a drive 6. As the carriages 5 are carried by the screw or spiral conveyor 4, the receiver body 3 is also indirectly driven by the drive 6.

Carriages 5 are (optionally) movable in direction B and/or R for setting an amplitude of the catch body movement, or the moment of the catch body movement.

Figure 2:
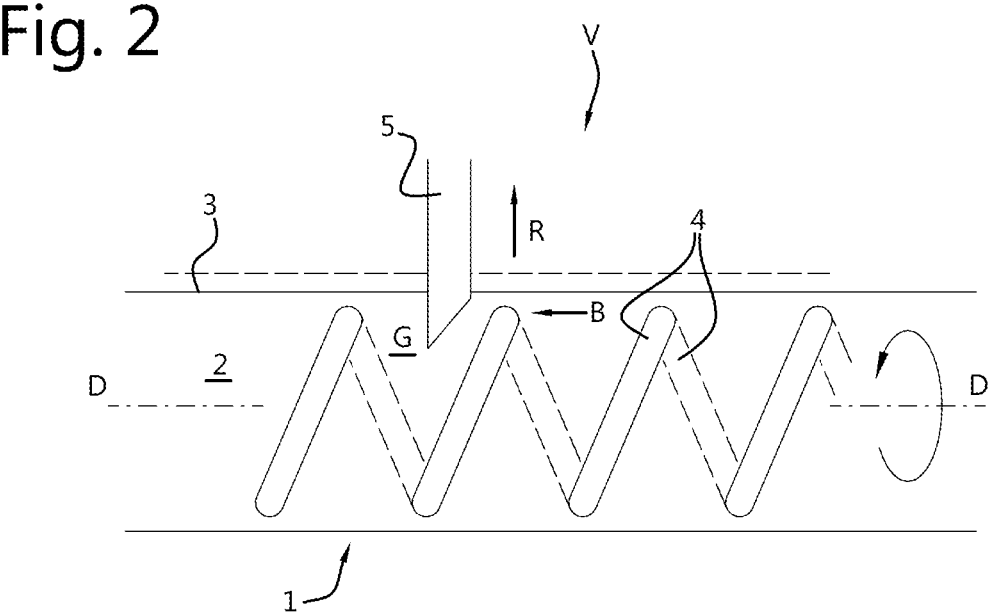
FIG. 2 shows an initial schematic detailed view of the facility from FIG. 1.

FIG. 2 shows a schematic detailed view of the device 1 from FIG. 1, from a viewing direction K. Visible is how the carriage 5 extends into the area G through which the spiral moves. When the screw or spiral conveyor 4 is driven to rotate about the axis D, the windings move in the direction B and the carriage 5 and thus the collection plate 3 are pushed in the direction R. In doing so, the catch plate 3 may be sliding or otherwise bearing-mounted, such as rolling, and may be equipped with a device (such as a spring) to force it back in a direction V against the (shown) direction R. Changing the rest position of the carriage 5 in the direction V increases the amplitude of displacement, and changing the rest position of the carriage 5 in the direction R decreases the amplitude of displacement.

Changing the rest position of the carriage 5 in the direction B delays the moment of displacement and moving against the direction B actually advances the moment.

Figure 3:
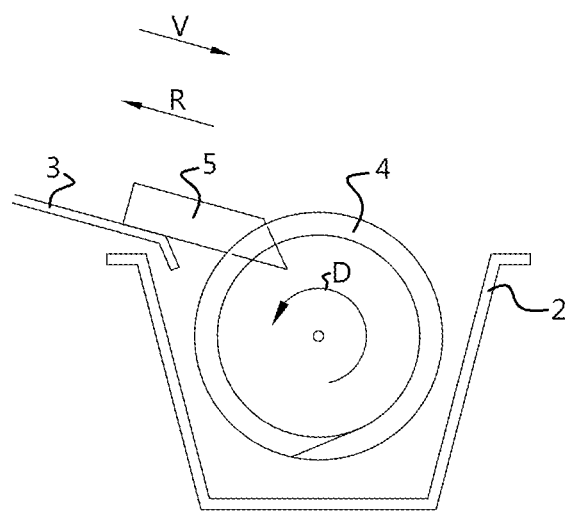
FIG. 3 shows a second schematic detailed view of the facility from FIG. 1.

FIG. 3 shows a second schematic detail view of a part of the device 1 from FIG. 1, from a viewpoint M in FIG. 1, showing how the catch body 3 extends into the gutter 2.

The invention claimed is:

1. Device for collecting litter or scrapings of flour or meal, including:

A collecting chute for receiving litter or scrapings,

A movable receiving body that extends diagonally from a highest portion to a lowest portion over an area in which the litter or scraps are to be collected and where the lowest portion is adjacent to or connects to the collecting chute or flows into the collecting chute; and A drive for moving the receiving body, wherein the receiving body is movable in a plane parallel to a tangent plane to said receiving body at the level of the lowest portion of said receiving body, wherein the drive is arranged to move the receiving body with at least one directional component in the direction of the collecting chute.

2. Device according to claim 1, wherein the receiving body comprises a plate and is substantially flat.

3. Device according to claim 1, wherein the drive is arranged for alternate movement of the receiving body.

4. Device according to claim 1, wherein the chute is provided with a driveable discharge device for discharging collected litter or scrapings from the collecting chute.

5. Device according to claim 4, wherein the movable receiving body and the discharge device are drivable by the same drive unit.

6. Device according to claim 5, wherein the discharge device comprises a screw or spiral conveyor and wherein the drive of the movable receiving body engages with the screw or spiral conveyor for the purpose of driving it.

7. Device according to claim 6, wherein the discharge device is provided with at least one carriage, such as a cantilever or ridge, extending into a space in which the screw or spiral conveyor moves during operation so that the at least one carriage is forced out of its position once per revolution by at least one circumferential part of the screw or spiral conveyor, taking the catch body with it.

8. Device according to claim 7, comprising multiple carriages, wherein at least one of the carriages is movable relative to the receiving body, having a directional component in the direction towards the screw or spiral conveyor, for setting an amplitude of movement of the receiving body, or in the direction in which the screw or spiral conveyor extends, for setting a moment of movement of the receiving body.

9. Device according to claim 1, comprising a conveyor for dough or dough pieces, in particular a conveyor belt, comprising a delivery point for unloading litter or shavings from the conveyor, wherein the collection device is arranged under the delivery point for collecting the litter or shavings.

10. Device according to claim 9, comprising a scraping device arranged at the delivery point for loosening the litter or scrapings from the conveyor, for the purpose of unloading them.

11. Method of collecting litter or scrapings, comprising:
- collecting the litter or scrapings on a receiving body extending obliquely to a collecting chute; and
- moving the receiving body, in alternate motion;
- wherein steps of the method are performed using a device for collecting litter or scrapings for flour or meal, including:
  - the collecting chute for receiving litter or scrapings;
  - the movable receiving body that extends diagonally from a highest portion to a lowest portion over an area in which the litter or scraps are to be collected and where the lowest portion is adjacent to or connects to the collecting chute or flows into the collecting chute; and
  - a drive for moving the receiving body, wherein the receiving body is movable in a plane parallel to a tangent plane to said receiving body at the level of the lowest portion of said receiving body.

12. Method according to claim 11, including removing the litter or scrapings from a gutter.

* * * * *